INVENTORS
FRANK E. ROSS
GERALD W. JONES
BY
William G. Landwier
AGENT

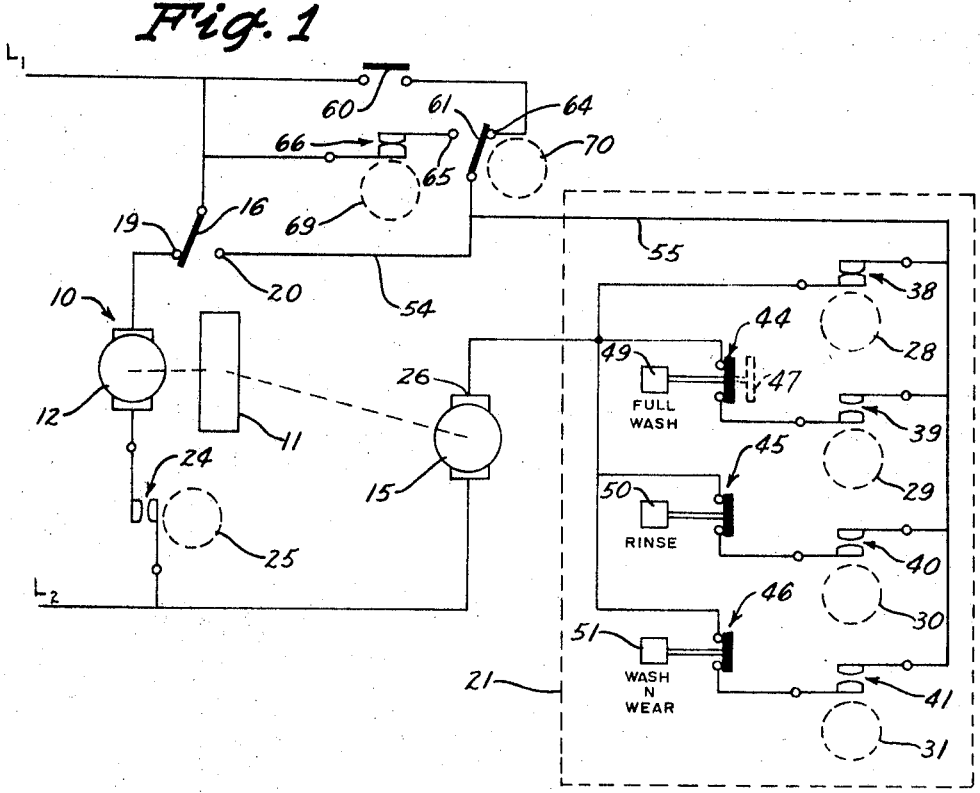

United States Patent Office 3,424,920
Patented Jan. 28, 1969

3,424,920
AUTOMATIC CONTROL CIRCUIT
Gerald W. Jones and Frank E. Ross, Newton, Iowa, assignors to The Maytag Company, Newton, Iowa, a corporation of Delaware
Filed June 9, 1966, Ser. No. 556,485
U.S. Cl. 307—141                                        13 Claims
Int. Cl. H01h 43/02

ABSTRACT OF THE DISCLOSURE

A control system is disclosed that is operable for preselecting and effecting consecutive operation of a pair of normally independent sequences of operations. A seeking system is operable for advancing a sequential control means to the beginning of the first desired cycle and, in cooperation with a holding circuit, is further operable for advancing the sequential control means to the beginning of the second desired cycle upon completion of the first selected cycle.

---

This invention relates to an automatic control system operable for controlling an apparatus through a plurality of selectable cycles of sequential operation and more particularly to a system for controlling the apparatus through at least a pair of individually-preselectable, consecutively-operable cycles of operation.

Recent developments in the laundry appliance field, for example, have included automatic controls for providing a programmed sequence of operations of the appliance. More advanced controls have provided a plurality of cycles from which a desired cycle or sequence of operations may be chosen. This type of control system includes means for locating the beginning of the desired cycle, sequentially advancing the timer mechanism to provide the selected cycle, and then stopping or de-energizing the appliance at completion of the selected cycle.

It is an object of this invention to provide an automatic control system operable for controlling an apparatus through at least a pair of individually-preselectable, consecutively-operable cycles of operation.

It is a further object of this invention to provide an automatic control system by which a pair of cycles of operation may be preselected for consecutive operation without further attention of the operator.

It is a further object of this invention to provide a control system having a holding circuit portion operable after selection of a first desired cycle for registering selection of a second cycle and delaying initiation of the second selected cycle until completion of the first selected cycle.

It is a further object of the present invention to provide flexibility of selection in a programmed cycle control system whereby the operator may select a pair of desired cycles of operation or establish a desired composite group of operations comprising two normally independent cycles of operation that are consecutively operable to provide the desired sequence of operations.

The present invention achieves the above objectives in an automatic control system having a rapid advance mechanism and a seeking circuit means and being operable for selecting a desired cycle of operations and advancing sequential control means to the beginning of the desired cycle of operations. In addition, the control system of the instant invention includes a holding circuit portion for selecting a second cycle and then delaying energization of the rapid advance mechanism until completion of the first selected cycle of operations. This holding circuit portion includes a switch operable from a first normal position to a second position for completing a circuit through a switch sequentially operated to the closed position at the completion of the first cycle. The rapid advance circuit is then energized undr control of the seeking circuit means to advance the sequential control means to the beginning of the second selected cycle.

Operation of the device and further objects and advantages thereof will become evident as the description proceeds and from an examination of the accompanying drawings which illustrate a preferred embodiment of the invention and in which similar numerals refer to similar parts throughout the several views, wherein:

FIGURE 1 is an electrical schematic circuit showing the control system of the instant invention;

FIGURE 2 is a development of cam profiles showing the specific portion of the cycle during which the sequentially cam-operated switches of FIGURE 1 are closed;

Figure 3:
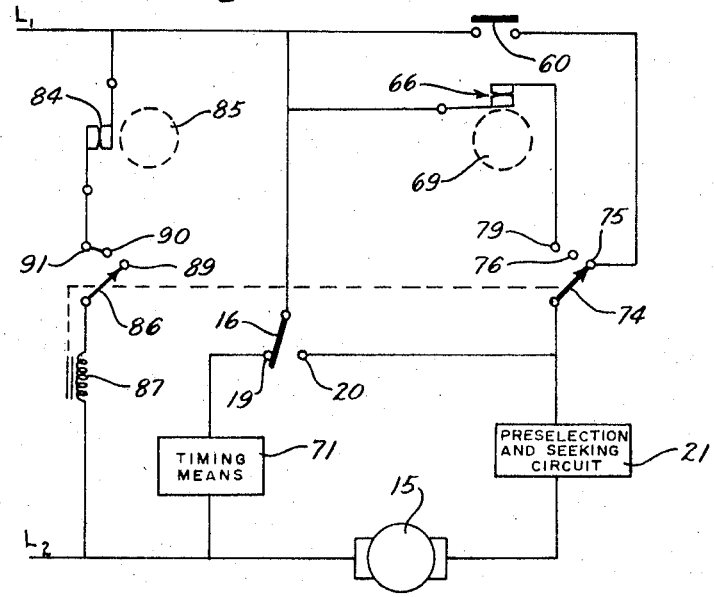
FIGURE 3 is a simplified electrical schematic circuit showing an alternate embodiment of the instant invention.

Referring now to FIGURE 1 in the drawings, there is shown an electrical schematic circuit including a number of diagrammatically illustrated components. This circuit may be used for controlling an electrically operated apparatus through a series of sequential operations and, in this embodiment, the control circuit is shown as controlling the operation of an automatic clothes laundering device. A timing mechanism 10 including sequential controller 11 and a timing motor 12 is operable for controlling the laundry machine through the usual laundry operations including washing, rinsing and spin drying of the fabrics to be treated. The timing mechanism 10 is of conventional construction with the sequential controller 11 including a cam stack, for example, operable for actuating a plurality of switch members between opened and closed positions and thereby energizing and de-energizing a plurality of electrically operable devices, for example. The cam stack portion of sequential controller 11 is driven by the timing motor 12 at a slow timing speed to sequentially energize and de-energize the component devices to provide a programmed cycle of operation.

A plurality of individually-selectable cycles of operations may be provided in a laundry apparatus by positioning the sequential controller 11 to one of a plurality of predetermined start positions within the normal control cycle of the sequential controller 11. A selection system operable for achieving this desired positioning of the sequential controller 11 to one of the plurality of start points may be provided by the control system disclosed in the United States Patent 3,215,867 issued to John C. Mellinger on Nov. 2, 1965, entitled Programming Control Device, and assigned to the assignee of the instant invention. The control system disclosed in U.S. 3,215,867 is operable for positioning the sequential controller 11 to a desired start position upon selection of a desired sequence of operations by the operator and is further operable for skipping a portion of the selected sequence of operations. Complete details of construction and operation of the referenced control system may be had upon referral to the aforementioned patent; however, its general function and operation in selecting the desired start position will be discussed hereinafter.

The sequential controller 11 is advanced to the beginning of the specific selected cycle, with a control system as disclosed in U.S. 3,215,867, by rotating the cam stack at high speeds by a rapid advance mechanism including a rapid advance motor 15. When the rapid advance motor 15 is energized, the timing motor 12 is de-energized and the cam stack is rotated at high speeds.

A control switch 16 is operable between contacts 19 and 20 responsive to energization and de-energization of the rapid advance motor. Control switch 16 may be made responsive to energization of the rapid advance motor, for example, by utilizing an axially movable armature in rapid advance motor 15. Control switch 16 is normally made to contact 19 for energizing timer motor 12 through sequentially operable switch 24 under control of cam 25. Upon initial energization of the rapid advance motor 15, switch 16 is moved from contact 19 to contact 20 to establish a bypass circuit for maintaining energization of the rapid advance motor 15 until de-energization is effected by the preselection and seeking circuit 21 as will be more fully described hereinafter. Upon de-energization of the rapid advance motor, switch 16 is operated to contact 19 for completing a circuit to timer motor 12 between power lines $L_1$, $L_2$.

It may be seen in FIGURE 1 that connection 26 of the rapid advance motor 15 is connected to contact 20 of the control switch 16 through a preselection and seeking circuit 21 as will now be shown. The preselection and seeking circuit system of the instant invention is characterized by a number of cams 28 through 31 for controlling corresponding cam switches 38 through 41. The scope of the invention, however, is not limited to use of such a cam arrangement. The cams of the seeking circuit and the respective switches which they control may be divided into two groups. In the first group is the master cam 28 and the switch 38 controlled by it. The second group includes slave cams 29 through 31 and their corresponding switches 39 through 41. The slave group of cams and switches may includes a greater or lesser number, depending upon the desired number of alternate start positions in the washing machine cycle of operations. In order to illustrate the instant invention, three selections or start positions are shown, and designated as "Full Wash," "Rinse" and "Wash n Wear."

A normally closed preselection switch member is provided in series with each one of the slave switches 39 through 41. These preselection switches 44 through 46 are operable to an open position, as indicated by dotted line position 47 of switch 44, upon actuation of one of the manually operable push buttons 49 through 51. One of the push buttons is designated for each of the three previously indicated cycles. For example, push button 49 may be actuated to select the start point for a "Full Wash" cycle, push button 50 for a "Rinse" only cycle, and push button 51 for a special "Wash n Wear" cycle. Additional push buttons, preselection switches, and associated circuitry may be provided for additional selectable cycles of operations or cycle start points. Actuation of one of the push buttons releases all other push buttons in this embodiment and operates the corresponding switch member to an open position at which it is latched and retained until another push button is actuated.

The master cam switch 38 is normally closed except for a small increment of time at the beginning of each desired cycle and the slave cam switches 39 through 41 are normally open except each switch is closed for a small increment of time at the beginning of a particular cycle. This sequencing shown in FIGURE 2 wherein developments of the cam profiles of cams 28 through 31 are shown with the shaded areas indicating those portions of the cycle during which each of the switches 38 through 41 is operated to the closed position. It will be noted from FIGURE 2 that during each portion of the cycle that the master cam switch 38 is open, one of the slave cam switches 39 through 41 is closed.

As indicated above, selection of a particular cycle of operation by actuation of one of the push buttons 49 through 51 opens one of the switches 44 through 46 for actuating the corresponding slave circuit to an open condition. Thus it may be seen that once the rapid advance motor 15 is energized it will remain energized by a circuit through either the master cam switch 38 or through one of the slave circuits until a specific location, corresponding to the beginning of the selected cycle of operations, is reached at which an open preselection switch, associated with the selected cycle, prevents continued energization of the rapid advance motor 15.

A momentary switch 60 is provided for initiating energization of the rapid advance motor 15. Momentary switch 60 is connected in series with a switch 61 closed to contact 64. The switch 60 is momentarily operated to the closed position responsive to actuation of any of the push buttons 49 through 51. Though a single momentary switch is shown, a separate momentary switch may be associated with each of the push buttons 49 through 51 and responsive to actuation thereof. Thus it may be seen that upon actuation of one of the selectable push buttons 49 through 51, the momentary switch 60 is closed to momentarily energize the rapid advance motor 15 through the circuit including the closed momentary switch 60 and switch 61 closed to contact 64.

Upon this energization of rapid advance motor 15, switch 16 closes to contact 20 for maintaining the rapid advance motor 15 energized by a circuit from line $L_1$ through the advance motor switch 16 made to contact 20, through conductor 54 and conductor 55, and then through the closed master switch 38 or one of the parallel slave circuits to connection 26 at one side of the rapid advance motor 15. The other side of the rapid advance motor is directly connected to power line $L_2$. The cam stack is rapidly rotated and effects the switching as indicated in FIGURE 2. Upon reaching the start point of the desired cycle of operation, an open push button switch will prevent the continued energization of the rapid advance motor 15. Thus the rapid advance motor 15 becomes de-energized and control switch 16 operates from contact 20 to contact 19 for energizing the timer motor 12 and advancing the sequential controller 11 through the selected cycle at a slow timing speed.

The instant invention achieves an improvement over the prior automatic preselection and seeking control systems by providing a holding circuit to facilitate the preselection of a second desired cycle of operation to be initiated immediately upon completion of the first selected cycle without further attention by the operator. This holding circuit arrangement includes the previously mentioned switch 61 that is operable from the normally closed contact 64 to contact 65 prior to selection of the second desired cycle of operations. In series with holding switch 61, when made to contact 65, is a cam-controlled switch 66 operable between the open and closed position by a cam member 69. It will be seen from an examination of FIGURE 2 that cam switch 66 is operated to the closed position during increments 43 and 72, the normal "off" positions for the controlled device. Thus the rapid advance motor 15 will be energized at the normal "off" position if holding switch 61 is operated to contact 65 prior to selection of a second desired cycle.

Holding switch 61 may be operable from its normal position at contact 64 upon manual actuation by the operator prior to operation of a second push button for selecting the second desired cycle of operations. A cam 70 may be provided for returning the switch 61 to its normal position made to contact 64 following initiation of the second selected cycle of operations. The switch may also be returned to its normal position by a cancelling circuit as will be more fully explained in conjunction with an alternate embodiment shown in FIGURE 3.

From the foregoing description of the circuit, the operation of the control system for selecting and effecting a first and second series of operations may be described. Let it first be assumed that it is desired to wash a load of fabrics through a regular "Full Wash" series of operations followed by an additional "Rinse" series of operations. To initiate operation of the device and to select the desired start point, the operator will depress or actuate the "Full Wash" push button 49 for actuating preselection switch 44 to the open position. Actuation of the push button 49 will also close momentary switch 60 for initiating energization of the rapid advance motor by a circuit from power line $L_1$ through the momentary switch 60, through holding switch 61 made to contact 64, through conductor 55, and through master cam switch 38 to connection 26 of the rapid advance motor 15. The other side of the rapid advance motor is connected to power line $L_2$. Energization of the rapid advance motor 15 will effect operation of the switch 16 from contact 19 to contact 20 for effecting continued energization of the rapid advance motor through a circuit which includes switch 16 made to contact 20 and conductor 54 connected to conductor 55. The rapid advance motor 15 will be maintained energized through either the master cam switch 38 and related circuitry or through one of the slave cam switches 39 through 41 and which are connected by a series of parallel circuits to the rapid advance motor. When the programmed start position for the "Full Wash" cycle is reached, the circuit will be interrupted since the master cam switch 38 is open at this position and, though slave switch 39 is closed at this position, preselection switch 44 is open for interrupting the circuit and de-energizing the rapid advance motor 15. De-energization of the rapid advance motor 15 effects operation of switch 16 from contact 20 to contact 19. This selection operation, in the instant embodiment, is accomplished in a period of approximately two to four seconds and thus is not a time consuming delay for the operation; however, it may be desirable to provide a time delay mechanism to prevent selection of the second cycle until after de-energization of the rapid advance motor.

Following completion of the advance to the start point of the first cycle, the operator may effect actuation of switch 61 from contact 64 to contact 65. Following this holding switch actuation, the operator will proceed to select the second desired cycle of operation which in this selected example is an additional "Rinse" operation. By actuating push button 50, switch 45 is opened and push button 49 is returned to its normal position for closing switch 44 and conditioning the seeking circuit for locating the start point of the "Rinse" cycle upon re-energization of the rapid advance motor. There is no further energization of the rapid advance motor 15 at this time, however, since the circuit leading from the momentary switch 60 is broken at contact 64, cam switch 66 is actuated to the open position, and rotor switch 16 is made to contact 19. Push button 50 remains actuated, however, for maintaining switch 45 in the open position to condition the seeking circuit for effecting a second seeking operation upon re-energization of the rapid advance motor. If the operator desires a repeat of the first selected cycle, all that is necessary, in the instant embodiment, is that the holding switch 61 be operated to contact 65 and that the push button for the first cycle be left in an actuated position.

Upon the completion of the selected first cycle, the cam-controlled timer mechanism 10 is advanced to increment 43, the normal "off" position following the regular "Full Wash" cycle. It is seen, however, that cam switch 66 is operated to the closed position and with holding switch 61 operated to contact 65 a circuit is completed from power line $L_1$ through cam switch 66 and holding switch 61 made to contact 65, and through conductor 55, and through master cam switch 38 for initiating energization of the rapid advance motor 15. Energization of the rapid advance motor 15 effects operation of switch 16 to contact 20 for maintaining the rapid advance motor energized even though cam switch 66 is operated to the open position upon advancement of the cam stack out of the "off" position. It may therefore be seen that by a circuit similar to that used in selecting the "Full Wash" cycle, the advance motor will be maintained energized until the start point corresponding to the beginning of the "Rinse" cycle is reached. At this position, increment 29, the circuit will be broken even though cam switch 40 is closed because preselection switch member 45 is actuated to the open position by push button 50. Upon de-energization of the rapid advance motor 15, the timing motor 12 will be energized for advancing the cam stack at slow timing speed through the selected "Rinse" cycle. Upon reaching increment 43, the apparatus will be de-energized since holding switch 61 has been previously operated by cam 70 from contact 65 to contact 64.

Referring now to FIGURE 3, there is shown an alternate circuit for achieving the objects of the instant invention. This is a simplified circuit as compared to FIGURE 1 and shows a portion of the components of FIGURE 1 diagrammatically. For example, the timing means including the sequential controller 11, timer motor 12 and cam operated switch 24 are all included in the block represented by numeral 71. Preselection and seeking circuit means, identical in operation and function to that of FIGURE 1, is shown diagrammatically as block 21.

The rapid advance motor 15 and switch 16 are shown in FIGURE 3 and are identical in operation and function to their counterparts in FIGURE 1. The same is true of momentary switch 60 and cam switch 66 as shown in FIGURE 3.

An alternate holding switch arrangement is shown in FIGURE 3. The holding switch 74 is operable between a first operative position at which a circuit is completed through contact 75, an intermediate position 76 at which no circuit is completed through switch 74 and a second operative position at which a circuit is completed through contact 79.

Switch 74 is linked to the preselection switches, as shown in FIGURE 1, through a conventional slider arrangement, for example, so that upon the operation of a first push button, the momentary switch 60 is closed for initiating energization of the rapid advance motor 15 and then holding switch 74 is operated from contact 75 to the intermediate position 76. Upon a second selection, switch 74 is operated from intermediate position 76 to contact 79. It is thus seen that if only one cycle is selected by the operator, the rapid advance motor will not be energized at the completion thereof because an energizing circuit may not be completed through the holding switch 74. If, however, a second circuit is selected, operation of holding switch 74 to its second operative position made to contact 79 facilitates completion of an energizing circuit to the rapid advance motor 15 upon the closure of cam switch 66 at the completion of the first selected series of operations.

Also provided in the circuit of FIGURE 3 is a cancelling circuit portion including cam switch 84 controlled by cam 85, cancel switch 86 and solenoid 87. Cancel switch 86 is linked to holding switch 74 so that it operates from the open circuit contact 89 to contacts 90 and 91 as switch 74 operates from contact 75 to contacts 76 and 79. Cancel solenoid 87 is connected to cancel switch 86 and holding switch 74 so that upon energization of the solenoid, cancel switch 86 is returned to contact 89 and holding switch 74 is returned to contact 75.

Figure 4:
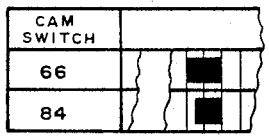
FIGURE 4 is a fragmentary portion of a cam development showing the relative operation of a pair of cam-operated switches.

Cam switch 84 is closed during the same increments as cam switch 66; however, cam switch 84 is controlled so as to be actuated after actuation of cam switch 66 as best shown in FIGURE 4. This delayed operation of cam switch 84 to the closed position facilitates energization of the rapid advance motor by a circuit including cam switch 66 and holding switch 74 made to contact 75 prior to completion of a circuit to solenoid 87. This initiates energization of the rapid advance motor 15 prior to operation of the cancel switch 86 and holding switch 74 to the normal deactuated position.

Thus it may be seen from the explanation relating to the alternate circuit, as shown in FIGURE 3, that the selection operation required of the operator is simplified. Specifically, it is seen that the operator may select the first desired cycle as shown in FIGURE 1. This actuation will condition the holding the holding switch for operation to its second operative position upon selection of the second cycle by the operator. The operator is required only to select the first desired cycle, wait approximately two to four seconds and then select the second desired cycle.

In summary, it is seen that the instant invention provides a circuit for allowing the operator to select a pair of consecutively-operable cycles or a composite cycle comprised of two normally independent portions at the beginning of the first operation without being required to return to the machine to reset the controls at the completion of the first cycle or portion. The circuit of the instant invention is an addition which provides flexibility of selection to the operator.

In the drawings and specification, there has been set fourth a preferred embodiment of the invention, and although specific terms are employed, these are used in a generic and descriptive sense only, and not for purposes of limitation. Changes in form and proportion of parts as well as the substitution of equivalents are contemplated, as circumstances may suggest or render expedient, without departing from the spirit or scope of this invention as further defined in the following claims.

We claim:

1. In an automatic control system for controlling an apparatus through at least one of a plurality of selectable sequences of operations, the combination comprising: sequential control means; timing means for advancing said sequential control means; rapid advance means for advancing said sequential control means at a relatively high speed; preselection means for choosing a first and a second sequence of operations; initiating circuit means for initiating energization of said rapid advance means to advance said sequential control means; seeking circuit means for controlling energization of said rapid advance means, said seeking circuit being conditioned by said preselection means for de-energizing said rapid advance means and energizing said timing means at the beginning of said first sequence of operations; and holding circuit means operable upon completion of said first sequence of operations for reenergizing said rapid advance means under control of said seeking circuit means for advancing said sequential control means to the beginning of said second sequence of operations.

2. In an automatic control system as defined in claim 1 wherein said first and second sequences of operations are individually preselectable and consecutively operable independent sequences of operations and wherein said holding circuit means is operable for delaying initiation of said second sequence of operations during said first sequence of operations and then is responsive to completion of said first sequence of operations for re-energizing said rapid advance means for advancing said sequential control means to the beginning of said second sequence of operations.

3. In an automatic control system for controlling an apparatus through at least one of a plurality of selectable sequences of operations, the combination comprising: sequential control means; timing means for advancing said sequential control means; rapid advance means for advancing said sequential control means at a relatively high speed; preselection means for choosing a first and a second sequence of operations; initiating circuit means for initiating energization of said rapid advance means to advance said sequential control means; seeking circuit means for controlling energization of said rapid advance means, said seeking circuit being conditioned by said preselection means for de-energizing said rapid advance means and energizing said timing means at the beginning of said first sequence of operations; and holding circuit means having a first condition and operable to a second condition for delaying initiation of said second sequence of operations during said first sequence and then operable to a third condition upon completion of said first sequence of operations for re-energizing said rapid advance means under control of said seeking circuit means for advancing said sequential control means to the beginning of said second sequence of operations.

4. In an automatic control system as defined in claim 3 wherein said holding circuit means includes a switch member operable from a first position to a second position for actuating said holding circuit means from said first to said second condition.

5. In an automatic control system as defined in claim 3 wherein said holding circuit means is operable to said second condition responsive to preselection of said second sequence of operations.

6. In an automatic control system as defined in claim 3 wherein said holding circuit means includes a holding switch operable between first and second positions for establishing said first and second conditions of said holding circuit means and wherein said holding circuit means further includes sequentially operable switch means for establishing said third condition at completion of said first sequence of operations to effect energization of said rapid advance means under control of said seeking circuit means for advancing said sequential control means to the beginning of said second sequence of operations.

7. In an automatic control system as defined in claim 3 wherein said holding circuit means includes a manually operable switch for actuating said holding circuit means from said first condition to said second condition prior to selection of said second sequence of operations.

8. In an automatic control system as defined in claim 7 and further including means for cancelling operation of said manually operable switch subsequent to initiation of said second sequence of operations.

9. In an automatic control system as defined in claim 3 wherein said holding circuit means includes a holding switch operable from a first position to an intermediate position responsive to selection of said first sequence of operations and operable from said intermediate position to a second position responsive to selection of said second sequence of operations to place said holding circuit means in said second condition.

10. In an automatic control system as defined in claim 9 and further including cancelling means for returning said holding switch from said second position to said first position upon completion of the second sequence of operations.

11. In an automatic control system as defined in claim 10 and wherein said cancelling means includes solenoid means for operating said holding switch and circuit portion means for selectively energizing said solenoid at completion of the second sequence of operations.

12. In an automatic control system as defined in claim 3 wherein said initiating circuit means includes a switch operated momentarily to a closed position responsive to selection of said first sequence of operations.

13. In an automatic control system as defined in claim 12 wherein said holding circuit means momentarily completes a circuit for energizing said rapid advance means upon completion of said first sequence of operations and wherein said seeking circuit means is operable for de-energizing said rapid advance means and energizing said timing means at the beginning of said second sequence of operations.

References Cited

UNITED STATES PATENTS

| | | | |
|---|---|---|---|
| 3,329,781 | 7/1967 | Wiser | 307—141.4 X |
| 3,351,785 | 11/1967 | Craig et al. | 307—141 |
| 3,365,582 | 1/1968 | Mellinger | 307—141 |

ROBERT K. SCHAEFER, *Primary Examiner.*

T. B. JOIKE, *Assistant Examiner.*

U.S. Cl. X.R.

318—103, 470